United States Patent [19]

Warnaar

[11] Patent Number: 5,674,027
[45] Date of Patent: Oct. 7, 1997

[54] EXAGGERATED ACTUATION AND BEARING-FREE ROTATIONAL MOBILITY IN SMART HINGES

[75] Inventor: Dirk B. Warnaar, Cary, N.C.

[73] Assignee: Applied Research Associates, Inc., Albuquerque, N. Mex.

[21] Appl. No.: 560,954

[22] Filed: Nov. 20, 1995

[51] Int. Cl.$^6$ .............................. H01L 31/05; F16B 1/00; F16C 11/10; F16C 11/00
[52] U.S. Cl. ..................... 403/404; 403/327; 403/322; 403/106; 403/83; 403/81; 403/28; 16/297; 16/385; 16/48.5
[58] Field of Search ........................ 403/28, 32, 79, 403/52, 81, 83, 84, 88, 92, 93, 106, 322, 327, 404, 179; 16/48.5, 297, 385; 244/173; 136/292, 243, 244, 245; 343/880, 881, 915, DIG. 2

[56] References Cited

U.S. PATENT DOCUMENTS

| | | |
|---|---|---|
| 3,450,372 | 6/1969 | de Lange . |
| 4,512,699 | 4/1985 | Jackson ........................... 403/28 X |
| 4,617,448 | 10/1986 | Goldowsky . |
| 4,654,092 | 3/1987 | Melton . |
| 4,700,541 | 10/1987 | Gabriel et al. . |
| 4,753,465 | 6/1988 | Dalby ............................ 244/158 R X |
| 4,797,085 | 1/1989 | Chiang et al. . |
| 4,869,585 | 9/1989 | Romanet . |
| 5,058,239 | 10/1991 | Lee ................................ 403/93 X |
| 5,095,595 | 3/1992 | Stella et al. ..................... 403/32 X |
| 5,114,104 | 5/1992 | Cincotta et al. . |
| 5,150,770 | 9/1992 | Secci . |
| 5,272,486 | 12/1993 | Dickinson . |
| 5,395,193 | 3/1995 | Krumme et al. . |
| 5,408,932 | 4/1995 | Hesse et al. ..................... 102/501 |

FOREIGN PATENT DOCUMENTS

| | | |
|---|---|---|
| 2-141397 | 5/1990 | Japan . |

OTHER PUBLICATIONS

Kubel, "Shape Memory Metals," Materials Engineering, pp. 27–30. Jun. 1984.

Stella et al., "SMA Applications In An Innovative Multishot Deployment Mechanism," 25th Aerospace Mechanism Symposium, pp. 275–290. May 1991.

Brook, "Boom Latch And release Mechanism For Space Satellites Actuated By A Shape Memory Alloy Trigger," Phase Transformations, pp. VI–1 to VI–3. Apr. 1979.

(List continued on next page.)

*Primary Examiner*—Anthony Knight
*Attorney, Agent, or Firm*—Jacobson, Price, Holman & Stern, PLLC

[57] ABSTRACT

The implementation of smart materials (shape-memory alloys (SMA) or piezoceramics) as integral actuating devices for single degree-of-freedom (DOF) hinges, thereby providing mobility as well as actuation to a wide range of mechanisms used in industrial, automotive and aircraft systems. A single DOF hinge is used in which smart materials are used both for actuation and for performance enhancement. The hinge consists of a tang and clevis, two conical inserts, one push block, one bolt and nut, and two washers. Assembly takes place by first putting the push block inside the clevis and putting the tang in place, then inserting the cones, inserting a bolt in the cones and finally tightening the bolt in this arrangement together with the nut to a specified torque. The amount of torque applied is related to the amount of preload in the undisturbed configuration of the hinge and the expansion of the conical inserts required to initiate rotation of the hinge. The smart material of the conical inserts is used to provide rotational mobility to the hinge. Applying a current causes the conical inserts, which are fabricated out of a smart material, to expand, thereby creating a gap between the conical inserts and the clevis. The existence of the free-play caused by the gap allows the clevis to rotate about the hinge's rotational axis. Once the hinge rotation is complete, the free-play in the hinge is eliminated by restoring the smart material of the conical inserts to the original (undisturbed) configuration, thereby pre-loading the hinge components.

17 Claims, 5 Drawing Sheets

OTHER PUBLICATIONS

Seidel, A., Schwabbauer, P., Hilmer, K.H., 1994 "Novel Orbital Disconnect Support for Cryogenic Tanks," Cryogenics, pp. 389–392.

Zhen WU, X.B., Vijay, K.V., and Vasundara, V.V., "A Study on Control of a Light Weight Robotic System Using Piezoelectric Motor, Sensor and Actuator," Proceedings of the ADPA/AIAA/ASME/SPIE Conference on Active Materials and Adaptive Structures, Alexandria Virginia, pp. 161–166, 1991.

Wayman, C.M., "Shape Memory and Related Effects," Proceedings of The ADPA/AIAA/ASME/SPIE Conference on Active Materials and Adaptive Structures, Alexandria, Virginia, pp. 161–166, 1991.

Stoeckel, D., and Simpson, J., "Actuation and Control with Ni-Ti Shape Memory Alloys,", Alexandria, Virginia, pp. 135–143, 1994.

Lynch, T., "Smart Suspension Controls Table Motion," Design News, pp. 63–66, 1992.

McCarty, L.H., "Shape-Memory Alloy Drives Rotary Actuator," Design News, pp. 180–181, 1990.

McCarty, L.H., "Shape-Memory Alloy Actuates Separation Device," Design News, pp. 78–79, 1991.

Kloepel, J.E., "Shaping the Future with Smart Materials," Materials Performance, pp. 92–93, 1993.

Savage, S.J., "Engineering Aspects of Shape-Memory Alloys," Materials and Science Technology, p. 973, 1991.

Lu, L, Lai, M. O., and Zhang, S., "Preparation of Copper Based Shape Memory Alloy Via Mechanical Alloying Technique," Material Science and Technology, pp. 319–322, 1994.

Chamberlain, G., "Memory Metal Makes Its Mark" Design News, pp. 26–27, 1986.

McCarty, L.H., "Shape-Memory Metal Actuates Disc Drive Head" Design News, pp. 188–189, 1986.

Monkman, G.J., "Robotic Compliance Control Using Memory Foams," The Industrial Robot, No. 4, pp. 31–32, 1991.

Isalgue, A., Torra, V., "High-Resolution Equipment for Martensitic Transformation in Shape Memory Alloys: Local Studies in Stress–Strain–Temperature," Measurement Science and Technology, pp. 456–461, 1993.

Schetky, L. McD., "Shape Memory Effect Alloys for Robotic Devices," Robotics Age, V6, pp. 13–17, 1984.

Boggs, R.N., "How Memory Metals Shape Product Designs," Design News, pp. 72–74, 1993.

Adnyana, D.N., "A Copper-Based Alloy for Shape Memory Wires and Springs," Wire Journal International, pp. 52–61, 1984.

Jean, R.D., Hu, C.T., 1994 "Shape Memory Effect by Constant Stress Ageing in Ti—Ni Alloy," Journal of Materials Science, pp. 449–455.

Tanaka, K., Hayashi, T. and Nishimura, F., "Hysteretic Behavior in an Fe—Cr—Ni—Mn—Si Polycrystalline Shape Memory Alloy During Thermomechanical Cyclic Loading," Journal of Materials Engineering and Performance, pp. 135–143, 1994.

Stoeckel, D., "Shape-Memory Alloys Prompt New Actuator Designs," Advanced Materials and Processes, V138, pp. 33–38, 1990.

McNichols, J.L., Jr. and Cory, J.S., "Thermodynamics of Nitinol" Journal of Applied Physics, pp. 972–984, 1987.

Kuribayashi, K., "Improvement of the Response of an SMA Actuator Using a Temperature Sensor," International Journal of Robotics Research, pp. 13–20, 1991.

Inaba, S., Hane, K., "Miniature Actuator Driven Photothermally Using a Shape-Memory Alloy," Review of Scientific Instruments, pp. 1633–1635, 1993.

(free-play)

(non linearity in bearing)

(different tension and compression characteristic)

(undisturbed configuration)

(disturbed configuration)

EXAGGERATED ACTUATION AND BEARING-FREE ROTATIONAL MOBILITY IN SMART HINGES

FIELD OF THE INVENTION

This invention relates to the field of smart materials for use in a hinge.

BACKGROUND OF THE INVENTION

Single degree of freedom (DOF) hinges are widely used in mechanisms with spacecraft and commercial applications. Examples of such mechanisms are doors, hoods, landing gear, collapsible wings and deployment devices for solar arrays. It is noted that in each case, actuation is required to perform a given task and/or reach a desired configuration. Current design practices assume that the driver of the mechanism constitutes a separate device and that hinges are only used to provide mobility.

Many applications only make use of hinges to go from one configuration to another, as in an umbrella for example. In this type of mechanism, locks need to be introduced to terminate the movement and maintain a fixed configuration.

Conventional drivers for mechanisms tend to be bulky, heavy and cannot be placed inside a hinge. Recent efforts to improve current hinges have led to the development of conventional, high performance hinges that are characterized by complex geometries and large part-counts, making them expensive to produce and therefore impractical for most applications.

Smart materials have the potential of eliminating conventional drivers, miniaturization of existing designs and provide quiet operation. The use of the smart materials has been widely investigated. However, most implementations of smart materials involve a single application of a mechanism that undergoes relative small motions. The difficulty with this approach is that each new mechanism must be designed from scratch and does not utilize the fruits of previous design efforts. To avoid this shortcoming, smart materials must be integrated in components of mechanisms, such as hinges, that can readily be adapted to a wide variety of mechanisms.

SUMMARY OF THE INVENTION

An opportunity exists for the implementation of smart materials (shape-memory alloys (SMA) or piezoceramics) as integral actuating devices for single degree-of-freedom (DOF) hinges, thereby providing mobility as well as actuation to a wide range of mechanisms used in industrial, automotive and aircraft systems. Smart materials offer the potential of eliminating components and miniaturizing existing designs or components of existing designs. Incorporation of smart materials may therefore result in tremendous cost savings and mass reduction, and expand the range of applications of high performance hinges. Furthermore, miniaturization and quiet operation of single DOF hinges may lead to new and innovative applications, such as those desirable for spacecraft, submarine and counter-intelligence missions.

A single degree-of-freedom hinge according to the present invention exaggerates actuation by either a piezoceramic or a shape-memory alloy. The hinge is a marriage of two concepts, one providing exaggerated excitation and the other providing bearing-free rotational mobility. The first concept translates the relatively small motion achievable with smart materials (shape-memory alloys or piezoceramics) into a large rotation using appropriate rolling contact surfaces. The second concept comprises a hinge equipped with conical inserts that when activated allow free rotational movement about the hinge's axis but otherwise pre-load the hinge. The rotational mobility of this hinge does therefore not compromise the load carrying capability of the hinge, nor its predictability and reliability. The features of the aforementioned concepts are combined to create a low cost, versatile hinge that provides actuation, is highly reliable and predictable.

The smart hinge of the present invention has substantial dual-use potential. For military and civilian applications it provides a very cost effective alternative to existing hinges, actuators and locking devices. However, it is also used to monitor the performance of mechanisms and reduce the noise level associated with conventional drivers. In this context the smart hinge represents an economical alternative to existing hinges and at the same time, sparks the development of significant innovations.

By the present invention, a single DOF hinge is used in which smart materials provide both actuation and performance enhancement. The hinge consists of a tang and clevis, two conical inserts, one push block, one bolt and nut, and two washers. Assembly takes place by first putting the push block inside the clevis and putting the tang in place, then inserting the cones, inserting a bolt in the cones and finally tightening the bolt in this arrangement together with the nut to a specified torque. The amount of torque applied is related to the amount of preload in the undisturbed configuration of the hinge and the expansion of the conical inserts required to initiate rotation of the hinge.

The design of the present invention incorporates smart materials (either shape-memory alloys or piezoceramics). "Shape Memory" describes the effect of restoring the original shape of a plastically deformed sample through thermal excitation, whereas a piezoceramic expands in reaction to an electric current. In both cases the effect is used to generate motion and force. The primary advantages of using smart materials (shape-memory alloys and piezoceramics) as actuators are that they often fit into tight spaces in existing designs, that they provide quiet operation and that, by controlling the power during electrical actuation, specific force levels and/or specific positions can be maintained. Hence these materials offer the potential of reducing the part-count in existing designs, reducing the number of individual devices needed to perform a given task, and reducing the size of a design.

The hinge of the present invention uses the smart material of the conical inserts to provide rotational mobility to the hinge. Applying a current causes the conical inserts, which are fabricated out of a smart material, to expand, thereby creating a gap between the conical inserts and the clevis. The existence of the free-play caused by the gap allows the clevis to rotate about the hinge's rotational axis. Once the hinge rotation is complete, the free-play in the hinge is eliminated by restoring the smart material of the conical inserts to the original (undisturbed) configuration, thereby pre-loading the hinge components. It is noted that the smart material only needs to be activated during operation so the hinge does not consume power while the mechanism is in rest. This offers a considerable advantage in applications with sporadic or intermittent operation.

The hinge of the present invention exaggerates the relatively small motion achievable with smart materials into a large rotation of the hinge. The individual shapes of the rolling contact surfaces in this hinge determine the relationship between the displacement provided by the smart material and the rotation of the hinge. By choosing appropriate contours for the contact surfaces of the tang and push block, expansion of the insert results in rotation of the tang. This feature can also be used to tailor the dynamic performance of the hinge. For example, a hinge is designed to approach a certain rotation angle asymptotically although the smart material was given a ramp or step input.

Use of the hinge of the present invention will improve the reliability and predictability of mechanisms by eliminating bearings and applying pre-load to hinge components when the mechanism is in rest. Existing designs of single DOF hinges achieve low friction rotational mobility of hinges through rolling elements such as bearings or by introducing a certain amount of free-play between hinge components at every hinge angle. In both cases the poor load transfer, resulting from the interruption of the load path by hinge components, is observed as a non-linearity during a compression-tension load cycle of the hinge. This phenomena is undesirable since it leads to designs with unpredictable dynamic behavior. By using smart materials in the hinge, the free-play that is introduced to provide rotational mobility can be turned into a pre-load in the hinge when the mechanism is in rest, eliminating the deficiencies of existing hinge designs.

In summary, the hinge of the present invention has the following advantages over conventional hinges:

1. Rotational mobility is achieved without compromising the load carrying capability.
2. The hinge requires no lubrication.
3. The hinge has zero free-play in the undisturbed configuration (when no current is applied to the smart materials in the hinge).
4. The amount of pre-load in the hinge can be specified.
5. The hinge has very few parts.
6. Assembly is straight-forward. Ample room is available to position components during assembly or to remove components during disassembly.

One use of the smart hinge of the present invention is to implement the self-actuating single DOF hinge in the design of a solar array for the Earth Observatory Satellite (EOS) under development by NASA. The hinge will be designed to replace the deployment mechanism currently envisioned to deploy the solar array, thereby using the full potential of the hinge.

The current design of the solar array of the Earth Observation Satellite uses a boom to deploy the solar array and maintain the final configuration. This boom consists of a large number of pre-buckled struts that are connected by hinges to three longerons. Deployment of the boom takes place by using two electric motors. One motor releases a wire that provides the restraining force to the pre-buckled struts. Upon releasing the wire the mast extends out of the canister that was used for storage of the boom and retraining it during launch. During deployment, the top of the mast rotates with respect to the base. To compensate this rotation, a second motor rotates the base and keeps the top of the mast aligned with the segments of the solar array.

The boom currently used to deploy the solar arrays of the Earth Observatory Satellite can be eliminated by replacing the hinges of the solar array with the hinge of the present invention. This has the advantage that all the peripherals associated with the boom, i.e., the two electric motors, rotating mechanism, canister, and brackets attaching the canister to the spacecraft, can also be eliminated, leading to considerable mass savings. Another advantage is that the space vacated by the boom and its peripherals can be used for additional scientific instrumentation. Furthermore, the elimination of the boom and its peripherals will leave designers more freedom in placing the solar array on the spacecraft.

Single DOF hinges equipped with smart materials as in the present invention can be used to determine the configuration of the mechanism by using the inverse effect of exaggerated excitation whereby the hinge rotation is translated into compression of a piezoceramic. The resulting change in current in the piezoceramic establishes the relationship between the amount of compression and the position of the hinge.

As an alternative to the application described above, the hinge of the present invention can also be used to provide mobility as well as locking capabilities to mechanisms. In this configuration the push block is used to prevent the tang from rotating about the hinge axis instead of providing actuation to the mechanism. This application offers considerable advantages to existing mechanisms since it eliminates the need for separate and often bulky and massive locking devices that currently require conventional drivers to remove the restraint imposed by the locking device. It is noted that the aforementioned advantages of the smart hinge over conventional hinges are also applicable to this application.

Accordingly, it is an object of the present invention to provide a smart hinge using portions made of smart materials for controlled release and locking of a hinge assembly.

It is another object of the present invention to energize a smart material contained within a hinge assembly to control the locking and releasing of the hinge components so as to provide large rotation by relatively small motion and providing free rotational movement by bearing-free rotational mobility.

It is yet another object of the present invention to provide a low cost, versatile hinge that provides actuation by the energization of a smart material which is highly reliable and predictable.

It is still yet another object of the present invention to provide a locking mechanism controlled by a smart material spring to release engagement of a clevis and tang upon energization of the smart material.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
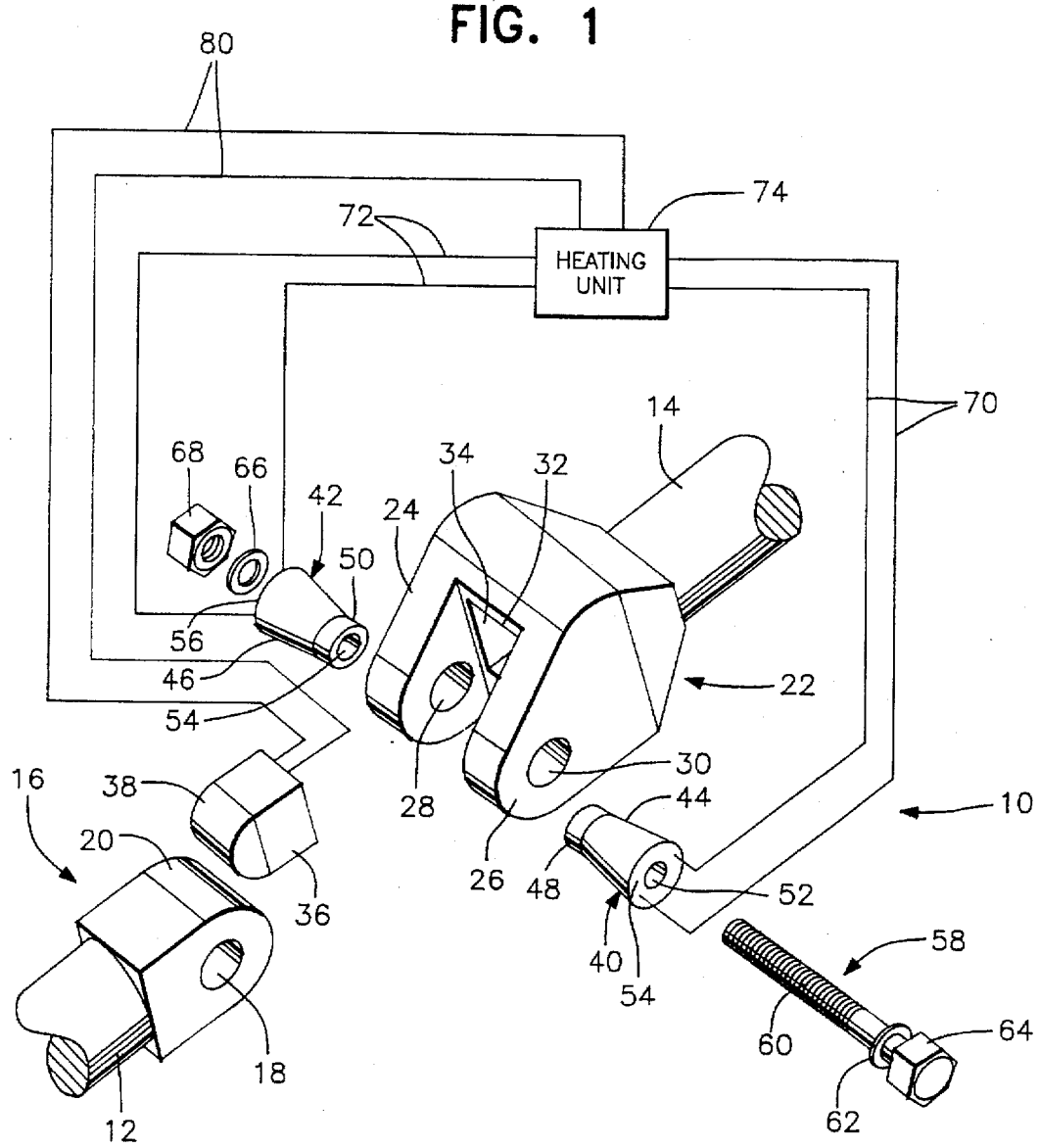
FIG. 1 is an exploded schematic view of a single degree of freedom hinge incorporating smart materials according to the principles of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2A:
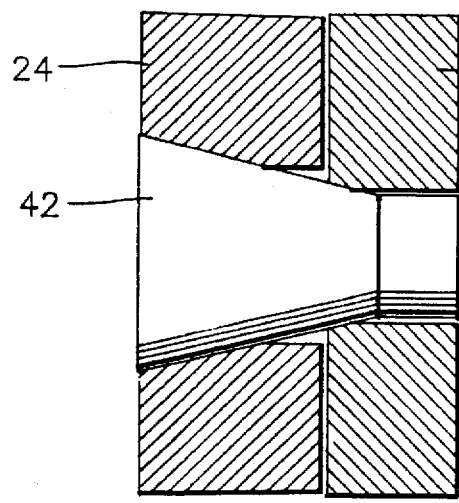
FIGS. 2A and 2B are partial sectional views illustrating an undisturbed configuration in FIG. 2A and the result of excitation of the smart material in FIG. 2B.
Figure 2B:
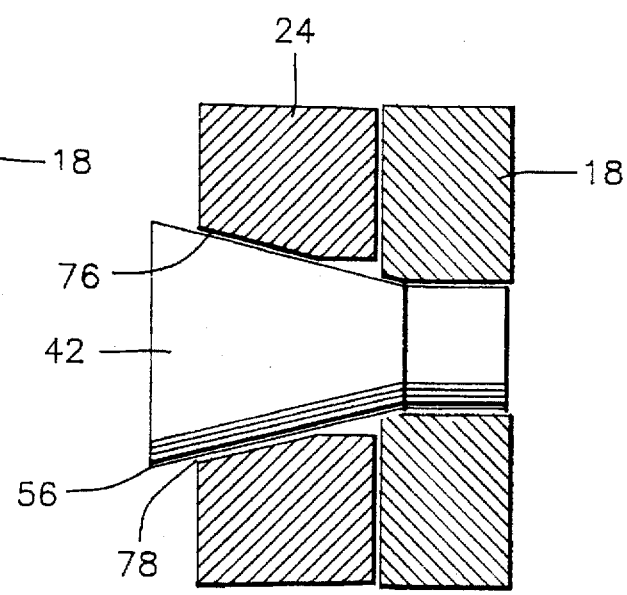
Figure 3:
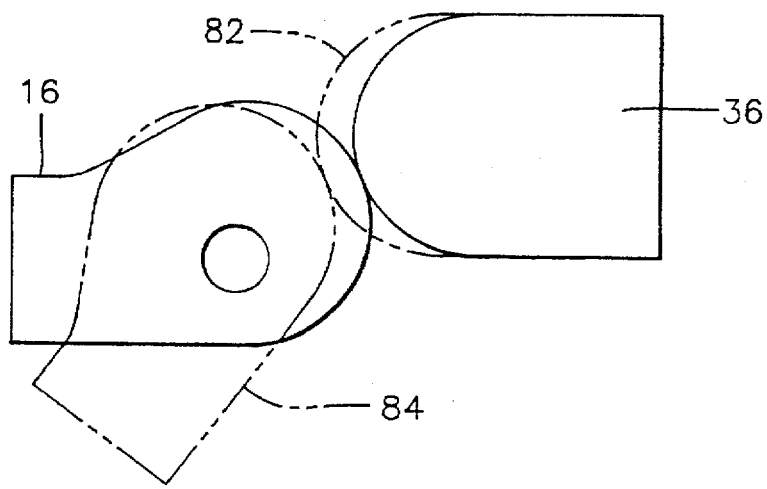
FIG. 3 illustrates an exaggeration of the motion produced by changing the location of a push block from an undisturbed configuration to a disturbed configuration and the resultant effect upon a tang of a hinge.

With reference to the drawings, in general, and to FIGS. 1-3, in particular, a smart hinge embodying the teachings of the subject invention is generally designated as 10. In FIG. 1, the hinge 10 is used to pivot two arms 12, 14 with respect to each other.

On arm 12, is located a tang 16 having a through hole 18 and a curved leading surface 20. On arm 14, is located a clevis 22 having arms 24 and 26, each having a through hole 28, 30, respectively. On a flat cross-piece 32 of the clevis 22 is located a recess 34. A push block 36 is shaped to fit within the recess 34 and have a curved leading surface 38 for engagement of the leading surface 20 of the tang 16.

Conically shaped inserts 40 and 42 include tapering surfaces 44 and 46, respectively, which taper down to cylindrical shaped sections 48, 50 respectively. Each insert includes a through hole 52, 54 respectively. The diameter of the outermost end surface 54, 56 of the inserts 40, 42 is equal in diameter to the diameter of the through holes 28, 30 at the exterior surface of the arms 24, 26 of the clevis 22.

In use, with the push block 36 located in the recess 34, the through hole 18 of the tang 16 aligns with the through holes 26, 28 of the clevis such that the inserts 40, 42 pass into the through holes, 28, 30, as shown in FIG. 2A so that the cylindrical portions 48, 50 extend into the through hole 18 of the tang. It is understood that in FIG. 2A only part of the tang 18 is shown for illustrative purposes. A bolt 58 having shaft 60 with a washer 62 adjacent to the bolt head 64, is passed through the openings 28, 30 of the clevis, opening 52 of the insert, opening 18 of the tang, opening 28 of the clevis, opening 54 of the insert and then through another washer 66 and ultimately into a nut 68 for tightening of the complete assembly together.

The conical inserts are made of a smart material and are connected by wires 70 and 72 to a heating unit 74 for controlling the heating of the conical inserts and excitation of the smart material.

As shown in FIG. 2A, the conical insert 42 is in an undisturbed configuration. The shape memory material, for example, of the insert was previously deformed to control the expansion of the shape memory material either radially and/or longitudinally. As shown in FIG. 2B, when the heating unit 74 is energized, the conical insert 42 reduces its dimensions in a radial direction and expands in the longitudinal direction.

The outer surface of the tapered portion 46 of the insert which was previously at an angle of approximately 15°, and engaged with a tapered interior surface 76 of the clevis arm 24 to lock the relative positions of the clevis and tang with respect to each other, has now become elongated to lessen the angle of the tapered surface 46 so that, as shown in FIG. 2B, the terminal end 56 extends out of the arm 24 and provides a gap 78 to allow rotation of the arm 24 and the clevis with respect to the tang 18. Depending upon the external restraints on the arms 12 or 14, the tang or the clevis are now allowed to move with respect to the other.

Alternatively, or in addition to the control of the movement of the hinge by the use of smart materials for the inserts 40, 42, the push block 36 as shown in the normal position in FIG. 3, reflects an undisturbed configuration of the push block. The push block made of a smart material, which is connected by wires 80 to heating unit 74, is controllable to move to a disturbed configuration as shown by line 82 in FIG. 3 so as to force the position of the tang 16 from its original position to a rotated position as shown by line 84. Upon termination of the energization of the push block by the heating unit, the push block 36 will revert to its undisturbed configuration and change rotation of the tang with respect to the clevis.

Figure 4A:
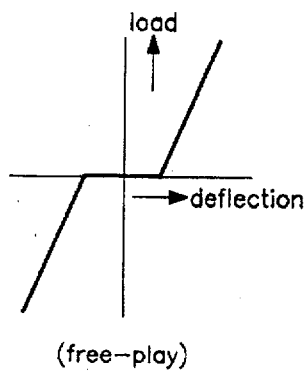
FIGS. 4A, 4B and 4C illustrate a compression-tension load cycle of a hinge which results in various forms of non-linearity.
Figure 4B:
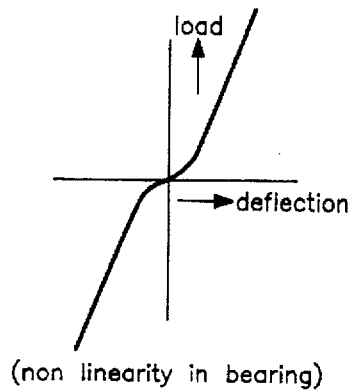
Figure 4C:
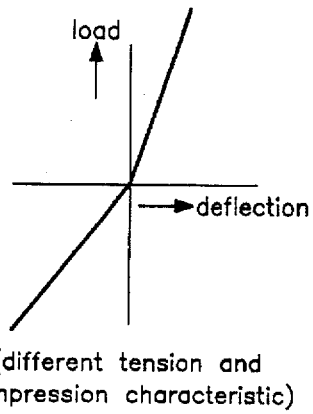

FIGS. 4A through 4C illustrate the various stages of movement in existing designs of single DOF hinges which attempts to achieve low friction rotational mobility by rolling elements such as bearings or by introduction of free play between hinge components at every hinge angle. A non-linearity of a compression-tension load cycle is demonstrated which is avoided by the smart hinge of the present invention.

Figure 5A:
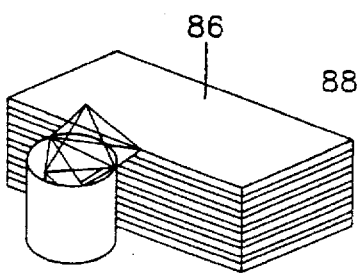
FIGS. 5A, 5B and 5C illustrate the various positions of a solar array of an Earth Observatory Satellite as deployed by a deployable boom.
Figure 5B:
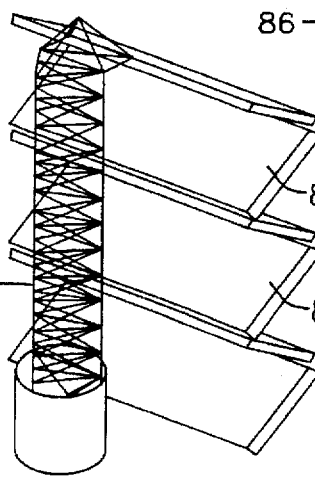
Figure 5C:
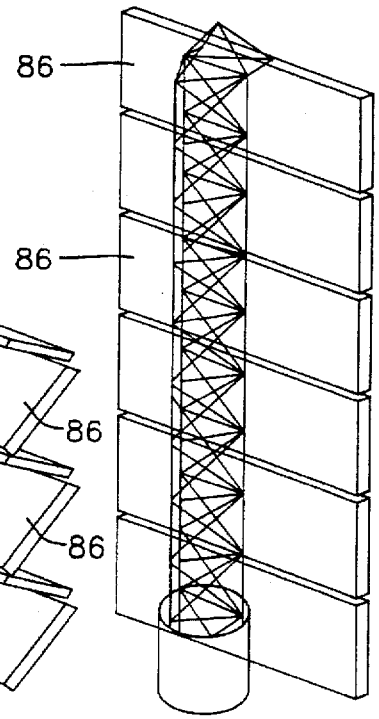

A use of the present invention in an earth observatory satellite would be to locate the hinge of the present invention between the various segments 86 of a solar array to avoid the necessity for a mast 88 and its accompanying motors and cables necessary to move the segments into an aligned array as shown in FIG. 5C.

The smart hinge of the present invention could be used to move the various segments into an aligned orientation by the control of the energization of the smart materials in the hinge so as to alternatively lock and release the various segments 86 with respect to each other in a desired sequence so as to move the segments into an aligned array.

Figure 6A:
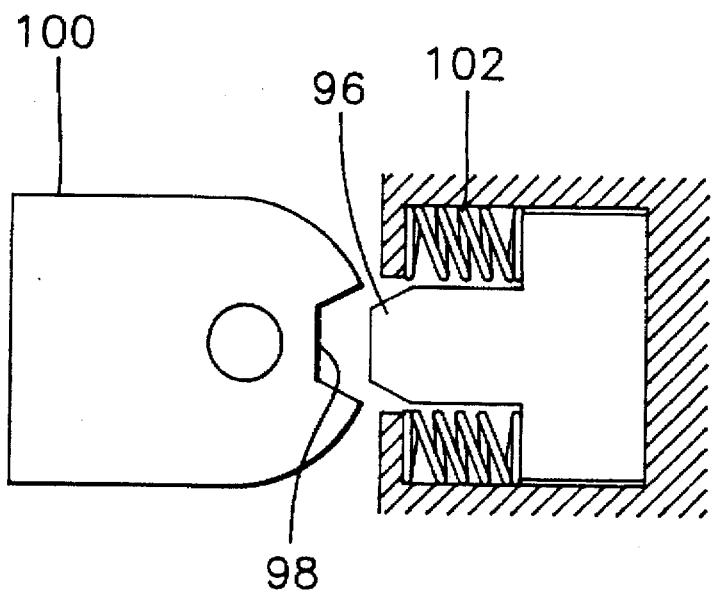
FIGS. 6A and 6B illustrate a locking mechanism for locking a position of a tang by smart material springs controlling movement of a push block.
Figure 6B:
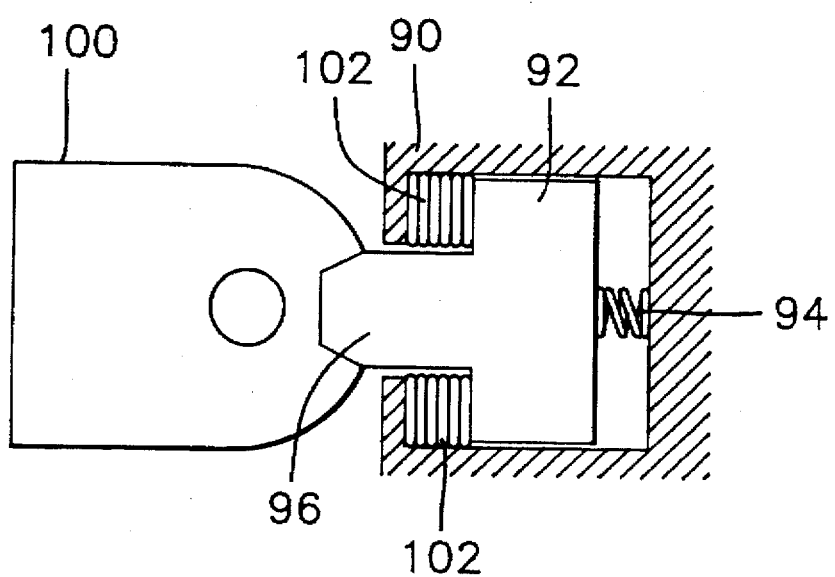

In addition, a locking mechanism embodying the teachings of the present invention is demonstrated in FIGS. 6A and 6B. Slidably mounted within a clevis 90 is a push block 92 biased by the force of spring 94 to have a plunger 96 of the push block moved into a recess 98 of a tang 100. In an undisturbed position are located two springs 102 made of a smart material which are in a compressed state due to the bias of spring 94. During excitation of the springs 102 by a heating element (not shown), as shown in FIG. 6A, the force of springs 102 overcomes the bias of spring 94 so as to retract the plunger 96 from the recess 98 of the tang 100, to allow movement of the tang 100 with respect to the clevis 102.

If it is desired to relock the tang in position with respect to the clevis, the energization of the smart material springs 102 is terminated so that the springs revert to their undisturbed configuration as shown as FIG. 6B so that the bias of spring 94 (omitted from FIG. 6A in the collapsed position), returns the plunger 96 into locking engagement in the recess 98 of tang 100.

Figure 7:
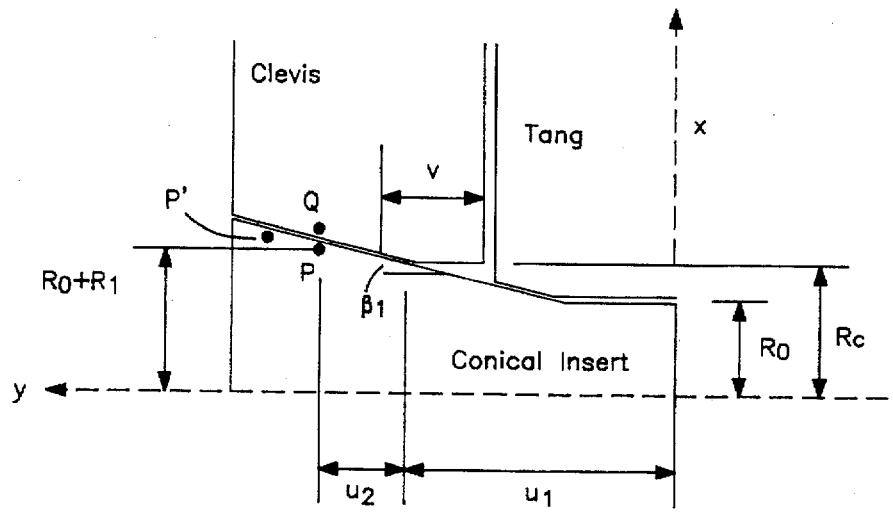
FIG. 7 illustrates the detail of the interface between a conical insert and the clevis.

The relative dimensions of the hinge components are defined by the operation of the hinge. To illustrate this, FIG. 7 shows a detail of the interface between a conical insert and the clevis. Assume that the conical insert is made out of a piezoceramic material with a factor of expansion $\alpha$, and that after expansion Point P has moved to Point P'. Using the notation in FIG. 7, the x-location of Point P' is given by:

$$\chi_P = R_c + \{(u_1+u_2)(1+\alpha)-v\} \tan \beta$$

Point Q is a point on the clevis that has the same y-location as Point P'. The x-location of Point Q is then given by:

$$\chi_Q = (R_0+u_2 \tan \beta)(1+\alpha)$$

The gap between the conical insert and the clevis can now be found by subtracting the x-locations of Points Q and P'. After the substitution of the following geometric relationship:

$$R_c-R_0 = (v-u_1) \tan \beta$$

the expression for the gap between the conical insert and the clevis simplifies to:

$$g = \alpha(u_1 \tan \beta - R_0)$$

Figure 8A:
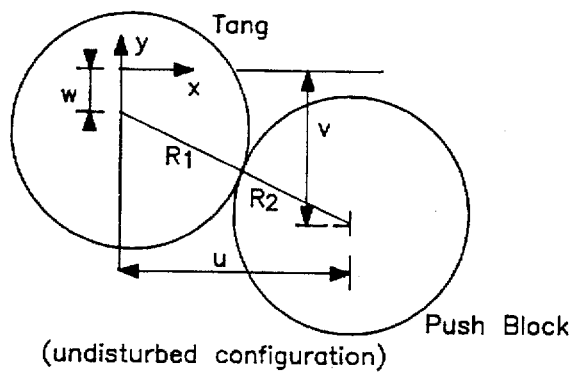
FIGS. 8A and 8B illustrate the relationship between a displacement induced by the push block and the rotation of the tang.
Figure 8B:
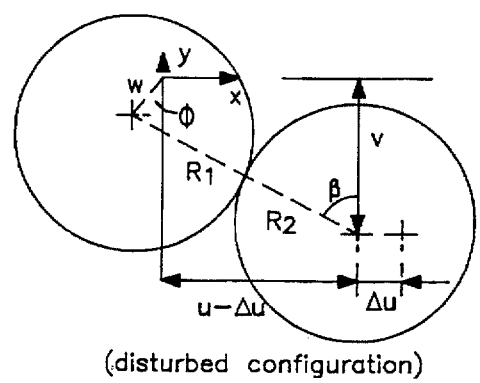

A relationship also exists between the motion of the push block and the hinge rotation. This relationship depends on the shape of the contact surfaces of the tang and the rectangular insert, and the relative location of the rotational axis of the hinge. Using the notation defined in FIGS. 8A and 8B the relationships for circular contact surfaces are:

$$\Delta u = u + w \sin\phi - \sqrt{(R_1+R_2)^2 - (v - w\cos\phi)^2}$$

It should be noted that the relationship between the motion of the push block and the rotation of the hinge is highly dependent on the contours of the individual contact surfaces. This feature can be used to tailor the dynamic performance of the hinge. For example, the contact surfaces of a hinge can be designed such that the hinge approaches a certain rotation angle asymptotically although the smart material was given a ramp input.

The selection of materials and derived design features, such as the torque applied to the nut and bolt combination, also influence the performance and reliability of the hinge. For example, the amount of torque applied is related to the amount of pre-load in the hinge and the expansion of the conical inserts required to initiate rotation of the hinge. To ensure reliable and predictable operation of the hinge, it is preferred that the cones have a taper of about fifteen degrees, that the surfaces of the conical inserts and the mating holes in the tang and clevis are smooth, and that the surfaces of the conical inserts are of a harder material than both the tang and clevis.

Final definition of the hinge design also include the sizing and placement of the electrical wires that provide the electrical power source to the smart materials, and the incorporation of the wires inside the components of the hinge that are made of smart materials. It is emphasized that the hinge must not only be designed to accommodate the wires but also assure that they do not interfere with the operation of the hinge and vice versa.

The shape-memory alloy must be heated to initiate the shape change and the accommodating force delivery of the alloy. For heating, a Kapton insulated flexible heater can be used, for example, with a heating output predetermined to activate the smart material. The heater may have the form of a thin, flexible pad and can be wrapped around the shape-memory alloy component and bonded with a pressure sensitive adhesive.

Smart materials can be used not only for actuation and a reduction of the part-count of single DOF hinges but also to increase the performance of existing mechanisms. For example, all rotation axes of the single DOF hinges must be aligned to allow a four-bar to move. If there is a slight deviation of any of the rotational axes, such as caused by manufacturing tolerances, then the mechanism can only move by elastic deformation of the links of the four-bar or the hinges themselves. Smart materials may be used in this application to make minute adjustments to the rotation axis of a hinge to correct any manufacturing inconsistencies, leading to an improved performance of the mechanism.

Single DOF hinges equipped with smart materials according to the present invention can be used to monitor entire mechanisms. This can be done by using the inverse effect of exaggerated excitation whereby the hinge rotation is translated into compression of a piezoceramic. The resulting change in current in the piezoceramic establishes the relationship between the amount of compression and the position of the hinge. This approach offers considerable advantages for applications requiring constant knowledge of the configuration of a mechanism but also for applications where the consistent operation of a mechanism is essential. In the latter, self-sensing hinges can be used to monitor a mechanism and warn a third party of changes in performance or imminent failure. The third party may be a person or a device such as "learning controller" which may step in and change the electrical input to a self-actuating hinge to correct the performance of the mechanism or shut it down.

Miniaturization and quiet operation of single DOF hinges attainable with smart materials may lead to other new and innovative applications, such as those desirable for submarine and counter intelligence missions. To accelerate acceptance of the use of smart materials in mechanisms, implementation of these materials must be geared towards replacing common components of existing designs. It is noted that this approach will only be successful if the use of these smart components leads to significant improvements in performance of existing designs without adding to their complexity, cost, mass or the demand on power resources as is achieved by the present invention.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A hinge comprising:
   a clevis including at least one through hole,
   a tang having a through hole,
   an insert extending into said at least one through hole of said clevis and said through hole of said tang, and
   a heating element secured to said insert,
   said clevis including a push block engaging said tang,
   said insert being made of a smart material for fixing a position of said clevis with respect to said tang in a first configuration of said insert,
   said insert changing to a second configuration by excitation of said insert due to energerization of said heating element so as to allow said clevis and said tang to move to a different position with respect to each other.

2. A hinge as claimed in claim 1, wherein said push block is a smart material connected to a heating element.

3. A hinge as claimed in claim 2, wherein said smart material is a shape-memory alloy.

4. A hinge as claimed in claim 2, wherein said smart material is a piezoceramic.

5. A hinge comprising:
- a clevis having two arms, each of said two arms including a through hole,
- a tang having a through hole,
- a recess in said clevis,
- a push block located in said recess, said push block being a smart material,
- said tang being located between said two arms of said clevis and engaging said push block,
- a heating element secured to said push block, and
- a bolt connecting said clevis and said tang so that a position of said tang is movable upon heating of said push block.

6. A hinge as claimed in claim 5, wherein an insert is located in each said through hole of said arm and extends into said through hole of said tang.

7. A hinge as claimed in claim 6, wherein said insert is a smart material with a heating element connected to said insert for allowing a change of position of said tang with respect to said insert.

8. A hinge as claimed in claim 5, wherein said smart material is a shape-memory alloy.

9. A hinge as claimed in claim 5, wherein said smart material is a piezoceramic.

10. A locking mechanism comprising:
- a tang,
- a clevis having a block engaging said tang to lock said tang in a fixed position with respect to said clevis,
- a smart material engaging said block and biasing said block into engagement with said clevis, said smart material being movable to overcome the bias of said block toward said tang to allow said tang to move from said fixed position with respect to said clevis, and
- a heating element providing an energerization force to said smart material for moving of said block away from said tang.

11. A locking mechanism as claimed in claim 12, wherein said push block is a plunger slidably mounted in said clevis and biased to lock said tang in said fixed position.

12. A locking mechanism as claimed in claim 11, wherein said smart material overcomes said bias of said push block to move said push block away from said tang so as to allow said tang to move with respect to said clevis.

13. A hinge comprising:
- a clevis including at least one through hole,
- a tang having a through hole,
- an insert extending into said at least one through hole of said clevis and said through hole of said tang, said insert being conically-shaped, and
- a heating element secured to said insert,
- said insert being made of a smart material for fixing a position of said clevis with respect to said tang in a first configuration of said insert,
- said insert changing to a second configuration by excitation of said insert due to energerization of said heating element so as to allow said clevis and said tang to move to a different position with respect to each other.

14. A hinge comprising:
- a clevis including at least one through hole,
- a tang having a through hole,
- an insert extending into said at least one through hole of said clevis and said through hole of said tang, said insert including a through hole and a bolt extending through said clevis, said tang and said insert, and
- a heating element secured to said insert,
- said insert being made of a smart material for fixing a position of said clevis with respect to said tang in a first configuration of said insert,
- said insert changing to a second configuration by excitation of said insert due to energerization of said heating element so as to allow said clevis and said tang to move to a different position with respect to each other.

15. A hinge comprising:
- a clevis including two arms with each arm including a through hole,
- a tang having a through hole,
- an insert extending into each said through hole of said clevis and said through hole of said tang, and
- said tang being positioned between said two arms of said clevis, with a bolt extending through said two arms, said two inserts and said tang,
- a heating element secured to each said insert,
- said inserts being made of a smart material for fixing a position of said clevis with respect to said tang in a first configuration of said inserts,
- said inserts changing to a second configuration by excitation of said inserts due to energerization of said heating element so as to allow said clevis and said tang to move to a different position with respect to each other.

16. A hinge comprising:
- a first part including at least one through hole,
- a second part having at least one through hole,
- a first smart material member extending into said at least one through hole of said first part and into said at least one through hole of said second part, and
- a second smart material member extending between said first part and said second part,
- a heating element secured to said first smart material member and said second smart material member,
- said first smart material member arresting a position of said first part with respect to said second part in a first configuration of said first smart material member and allowing movement between said first part and said second part in a second configuration,
- said second smart material member moving said first part with respect to said second part when said first smart material member is in said second configuration.

17. A hinge comprising:
- a clevis including at least one through hole,
- a tang having a through hole,
- an insert extending into said at least one through hole of said clevis and said through hole of said tang, and
- a heating element secured to said insert,
- said clevis including a push block engaging said tang, said push block being made of a smart material,
- said insert being made of a smart material for fixing a position of said clevis with respect to said tang in a first configuration of said insert,
- said insert changing to a second configuration by excitation of said insert due to energerization of said heating element so as to allow one of said clevis and said tang to move to a different position with respect to each other and said push block moving said one of said clevis and said tang to said different position by energerization of said push block.

* * * * *

UNITED STATES PATENT AND TRADEMARK OFFICE
CERTIFICATE OF CORRECTION

PATENT NO.    : 5,674,027
DATED         : October 7, 1997
INVENTOR(S)   : Dirk B. WARNAAR It is certified that error appears in the above-indentified patent and that said Letters Patent is hereby corrected as shown below:

Column 1, between lines 4 and 5, insert the following:

--This invention was made with Government support under contract F29601-95-C-0086 awarded by the United States Air Force. The Government has certain rights in the invention.--

Signed and Sealed this

Eleventh Day of May, 1999

*Attest:*

Q. TODD DICKINSON

*Attesting Officer*     *Acting Commissioner of Patents and Trademarks*